United States Patent Office 3,795,614
Patented Mar. 5, 1974

3,795,614
LUBRICATING OIL ADDITIVES
Takehiko Fujimoto, Mikio Nishimura, and Shoji Takigawa, Kyoto, Japan, assignors to Sanyo Chemical Industries, Ltd., Kyoto, Japan
No Drawing. Original application Aug. 22, 1969, Ser. No. 852,485, now Patent No. 3,651,029. Divided and this application Oct. 8, 1971, Ser. No. 187,849
Claims priority, application Japan, Aug. 26, 1968, 43/61,061
Int. Cl. C10m 1/32
U.S. Cl. 252—51.5 A                 9 Claims

ABSTRACT OF THE DISCLOSURE

Copolymers having as an essential unit thereof the radical

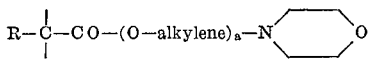

where $a$ is an integer of 1 or higher and R is hydrogen or methyl, are added to lubricating oils to improve the detergency, dispersancy and viscosity index thereof.

---

This is a divisional application of applicants copending application Ser. No. 852,485, filed Aug. 22, 1969, now U.S. Pat. No. 3,651,029.

This invention relates to lubricating oil additives and more particularly to oil-soluble copolymers which impart to lubricants improved properties of detergency, dispersancy viscosity index and the like.

The use of additives to improve the detergency, e.g. the sludge suspension properties, of lubricating oils is well known. Known additives used for such purpose are those containing metal such as polyvalent metal organic sulfonates, phenates and phosphates. While metal-containing detergent additives are useful, their incorporation may result in the formation of high ash deposits within an engine, as well as on valves, spark plugs, etc. with consequent lowering of engine efficiency. Another disadvantage of the above additives is that they do not improve the viscosity index of lubricants. To overcome the above disadvantages, metal-free additives, e.g. oil-soluble copolymers, have been proposed. However, they are not satisfactory in one or more respects.

It is, therefore, an object of this invention to provide new lubricating oil additives which are effective as outstanding ashless detergents, dispersants and viscosity index improvers. It is another object of this invention to provide improved lubricating compositions.

A new class of products has now been found which are exceedingly useful as additives for lubricating oils. These new products of this invention are oil-soluble copolymers having at least one unit (A) selected from the class consisting of the following General Formulas I and II:

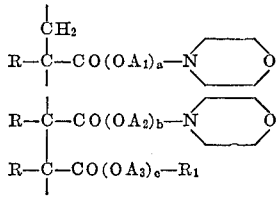

wherein each of $a$ and $b$ is an integer of 1 or higher (preferably 1–100, more preferably 1–10), $c$ is an integer of 0, 1 or higher (preferably 0–100, more preferably 0–10), $A_1$, $A_2$ and $A_3$ are the same of different ethylene groups which may be substituted with alkyl groups having 1–16 carbon atoms, R's are independently hydrogen atoms or methyl groups, and $R_1$ is hydroxyl group, residue of a hydroxyl compound or residue of an amino compound having at least one active hydrogen atom when $c$ is 0, and hydroxyl group or residue of an organic compound having at least one active hydrogen atom when $c$ is 1 or higher, at least one unit (B) selected from the class consisting of the following General Formula (III):

wherein R is hydrogen atom or methyl group, and $R_2$ is alkyl group having 1–4 carbon atoms, and at least one unit (C) selected from the class consisting of the following General Formula (IV):

wherein R is hydrogen atom or methyl group, and $R_3$ is alkyl group having at least 10 carbon atoms.

The term "residue" as used herein is intended to mean a remaining group after at least one active hydrogen atom is taken away from an organic compound having at least one active hydrogen atom, the activity of hydrogen atom being determined by Zerewitinoff method.

Any oil-soluble copolymer which contains the above three units (A), (B) and (C) may be used in this invention, by whichever method it may be produced. The copolymer may, for example, be produced by copolymerizing a polymerizable monomer of the unit (A), a polymerizable monomer of the unit (A), a polymerizable monomer of the unit (B) with a polymerizable monomer of the unit (C).

A class of monomers of the unit (A) represented by the Formula I is esters obtained by reacting (1) alkylene oxide adducts of morpholine with (2) α,β-unsaturated monocarboxylic acids or derivatives thereof in conventional methods. Thus, typical examples of the monomer giving the unit (A), Formula I are N-methacryloyloxyethylmorpholine
N-(2-methacryloyloxypropyl)morpholine
N-(2-methacryloyloxybutyl)morpholine
N-(2-methacryloyloxyoctadecyl)morpholine
N-acryloyloxyethylmorpholine
N-methacryloylpentaoxyethylmorpholine
N-(2-methacryloyldecaoxyethyl)morpholine
N-methacryloylpolyoxyethyl (20 mol) morpholine
N-(2-methacryloyloxypropyl)morpholine
N-(2-methacryloyloxydodecyl)morpholine A group of monomers, which give the unit (A) represented by the General Formula II in the present invention, is monoesters or diesters prepared, for example, by the reaction of (1) alkylene oxide adducts of morpholine with (2) α,β-unsaturated dicarboxylic acids or derivatives thereof in conventional methods. Thus, typical examples of the monomer giving the unit (A), Formula II are:

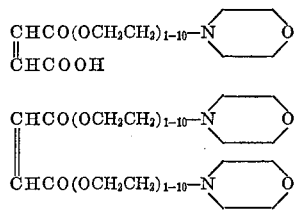

Another group of monomers of the General Formula II ($c=0$) is derivatives of α,β-unsaturated dicarboxylic acid, wherein one of the carboxyl groups in the acid is esterified with an alkylene oxide adduct of morpholine and wherein the other carboxyl group forms amide bond with an amino compound or ester bond with a hydroxyl compound. These derivatives may be obtained, for example, by half esterifying α,β-unsaturated dicarboxylic acids or derivatives thereof with alkylene oxide adducts of morpholine and then reacting the obtained products with amino compounds having at least one active hydrogen atom or hydroxyl compounds, and vice versa. Thus, typical examples of the above monomer are:

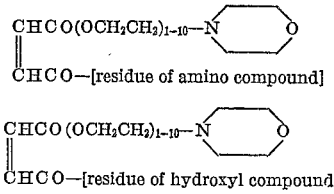

Further, another group of monomers of the General Formula II ($c=1$ or higher) is derivatives of α,β-unsaturated dicarboxylic acid, wherein one of the carboxyl groups in the acid is esterified with an alkylene oxide adduct of morpholine and wherein the other carboxyl group is also esterified with an alkylene oxide adduct of an organic compound (except morpholine) having at least one active hydrogen atom. These derivatives may be obtained, for example, by reacting α,β-unsaturated dicarboxylic acids or derivatives thereof with alkylene oxide adducts of morpholine and then reacting with alkylene oxide adducts or organic compounds (except morpholine) having at least one active hydrogen atom or alkylene oxides. Thus, typical examples of the above monomer are:

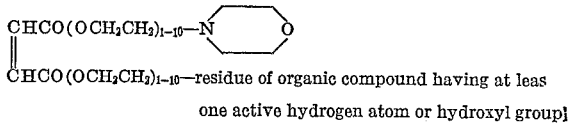

Preferable group $R_1$ in the Formula II are hydroxyl groups, residue of monohydroxyl compound and residue of monoamino compound, regardless of the value of $c$.

The most preferable unit (A) in the present invention is:

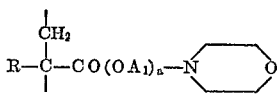

(wherein R is H or methyl group, $A_1$ is ethylene or propylene group, and $a$ is an integer of 1–5).

Monomers, which give the unit (B) represented by the General Formula III, are for example methyl acrylate, ethyl acrylate, propyl acrylate, n-butyl acrylate, isobutyl acrylate and t-butyl acrylate, and methacrylates corresponding to these acrylates.

Monomers, which give the unit (C) represented by the General Formula IV in the present invention, may be obtained for example by reacting α,β-unsaturated monocarboxylic acids or derivatives thereof with aliphatic alcohols containing 10 or more carbon atoms (preferably 10–20). Examples of these monomers are decyl acrylate, dodecyl acrylate, tridecyl acrylate, tetradecyl acrylate, pentadecyl acrylate, hexadecyl acrylate and octadecyl acrylate, and methacrylates corresponding to these acrylates.

Another method to obtain oil-soluble copolymers in the present invention comprises preparing copolymers as intermediates and then subjecting them to esterification, ester interchange, or amidification. Thus, for example, α,β-unsaturated monocarboxylic acid, α,β-unsaturated dicarboxylic acids (or derivatives thereof) which are starting materials for preparing the unit (A), monomers of the unit (B) and monomers of the unit (C) are copolymerized in the presence of a polymerization initiator, and then carboxyl groups, lower alkyl ester groups, or acid anhydried groups in the intermediate copolymers obtained are reacted with only alkylene oxide adducts of morpholine or with these and alkylene oxide adducts of organic compounds (except morpholine) having at least one active hydrogen atom, amino compounds, hydroxy compounds or alkylene oxides.

The polymerization in this invention may be carried out in any suitable procedure. They may, for example, be carried out in the presence of a polymerization catalyst such as a peroxide (benzoylperoxide, etc.) or azo compound (α,α'-azobisisobutyronitrile, etc.), in the presence or absence of an inert solvent such as mineral oil, under an atmosphere of nitrogen or carbon dioxide and at a temperature varying from room temperature to about 150° C. All other reactions such as addition of alkylene oxide, esterification, ester interchange and amidification in this invention may be carried by methods known per se in the art.

Examples of the raw materials used in the above-mentioned methods of preparing the oil soluble copolymers of the present invention may collectively be cited as follows: Examples of the α,β-unsaturated monocarboxylic acid and derivatives thereof are acrylic acid, methacrylic acid, lower alkyl ester of these acids (such as methyl-, ethyl- and butyl-acrylates, and methacrylates corresponding to the acrylates). Examples of the α,β-unsaturated dicarboxylic acid and derivatives thereof are maleic acid, itaconic acid, citraconic acid, fumaric acid, lower alkyl esters thereof (such as dimethyl maleate, diethyl maleate, dimethyl fumarate and dimethyl itaconate), anhydrides thereof (such as maleic anhydride, itaconic anhydride and citraconic anhydride).

Examples of the alkylene oxide are ethylene oxide, 1,2-propylene oxide, 1,2-butylene oxide, 1,2-octylene oxide, 1,2-dodecylene oxide, 1,2-hexadecylene oxide and 1,2-octadecylene oxide. Among these alkylene oxides, preferable are ethylene oxide, propylene oxide and a mixture thereof. When at least 2 moles of alkylene oxide are added to organic compounds having at least one active hydrogen atom, two kinds of alkylene oxides, for example ethylene oxide and propylene oxide, may be used. Amount of the alkylene oxide added is preferably 1–100 moles, more preferably 1–10 moles, but in the case of $c$ in the Formula II, 0 100 moles of the alkylene oxide are preferable and 0–10 moles are more preferable.

Examples of the amino compounds having at least one active hydrogen atom are ethylamine, diethylamine, propylamine, dipropylamine, isopropylamine, diisopropylamine, butylamine, dibutylamine, isobutylamine, diisobutylamine, sec.-butylamine, tert.-butylamine, hexylamine, octylamine, 2-ethylhexylamine, decylamine, dodecylamine, tetradecylamine, hexadecylamine, octadecylamine, cyclohexylamine, benzylamine, monoacetylethylenediamine, monobutyroylethylenediamine, monocaproyloxyethylenediamine, monolauroylethylenediamine, monostearoylethylenediamine, monobenzoylethylenediamine, dimethylaminoethylamine, diethylaminoethylamine, dimethylaminopropylamine, diethylaminopropylamine, dipropylaminopropylamine, dibutylaminopropylamine, aniline, morpholine, pyrrolidine, piperidine, imidazole, imidazoline, γ-butyrolactam, ε-caprolactam, and mixtures thereof. Examples of the hydroxy compounds are methyl alcohol, ethyl alcohol, propyl alcohol, isopropyl alcohol, butyl alcohol, isobutyl alcohol, sec.-butyl alcohol, tert.-butyl alcohol, isoamyl alcohol, hexyl alcohol, octyl alcohol, 2-ethylhexyl alcohol, decyl alcohol, dodecyl alcohol, tetradecyl alcohol, hexadecyl alcohol, octadecyl alcohol, cyclohexyl alcohol, benzyl alcohol, phenols, hydroxystearic acid, hydroxystearylamide, hydroxystearylmethyl ester. Examples of the organic compound having at least one active hydrogen atom are amino compounds and hydroxy compounds mentioned above. Other examples are acetic acid, caproic acid, capric acid, lauric acid, myristic acid, palmitic acid, stearic acid.

The ratio of the units (A), (B) and (C) in the copolymer of the present invention may vary in such range that the copolymer has oil-solubility. The ratio is generally 0.5–30 (A) 1–60 (B): at least 10 (C) by weight, preferably 0.5–15:5–50: at least 35. The oil-soluble copolymers in the present invention generally have viscosities of 1,000–50,000 cst. in 30% mineral oil (100 neutral) solution at 37.8° C. (100° F.).

The copolymers in the present invention may contain one or more other units (D) in addition to the units (A), (B) and (C). Representative examples of the monomer for the unit (D) are acrylonitrile, methacrylonitrile, styrene, vinyl acetate, vinyl laurate, vinyl stearate, hexyl acrylate, 2-ethylhexyl acrylate, octyl acrylate, hexyl methacrylate, 2-ethylhexyl methacrylate, octyl methacrylate.

The copolymers of this invention may be incorporated in lubricating oils by simply blending with stirring at ordinary temperature or, if desired, at elevated temperatures. In many instances it is convenient to carry out the preparation of the copolymer directly in a solution of lubricating oil, since the addition of such solution to lubricating oils is easy to obtain the desired concentration. The amount of the copolymer to be added to the lubricating oils may be 0.01–30% (active component) by weight based on the oil. Master batches containing 30% or higher of the copolymer by weight based on the oil may be made for convenience in handling prior to preparation of large batches of the lubricant. The lubricating oils may contain, in addition to the copolymer of this invention, conventional additives such as detergents, viscosity index improvers, antioxidants, pour point depressants, corrosion inhibitors, etc. Lubricating oils used in the present invention may be any natural or synthetic material having lubricating properties. Preferable examples are hydrocarbon oils and polymerized olefins of wide viscosity range. These oils may be blended with castor oil, lard oil, polyetherpolyols, organic esters, polyalkyl silicon oil and mixtures thereof.

The additive copolymers of this invention impart to lubricating oils improved viscosity index and pour depressant properties, as well as improved detergent properties, and they result in little troublesome deposits within the engine, because they are free from any metal.

The following examples illustrate the preparation of typical copolymers to be used as additives in the present invention.

EXAMPLE 1

2.5 g. of N-methacryloyloxyethylmorpholine, 10 g. of methyl methacrylate, 87.5 g. of dodecyl methacrylate, 1 g. of $\tau,\tau'$-azobisisobutyronitrile and 233 g. of mineral oil were placed in a 500 cc. four-necked flask equipped with a thermometer, a stirrer, a reflux condenser and a nitrogen inlet tube. (The same flask was used in all examples and references, and the same amount of $\alpha,\alpha'$-azobisisobutyronitrile and mineral oil was used in the polymerizations of all examples and references.) The mixture was heated at 70° C. with stirring under an atmosphere of nitrogen for 5 hours, to obtain the lubricating oil additive of the present invention, which had viscosity of 6,200 cst. at 37.8° C. (100° F.), and nitrogen content of the copolymer was 0.166%.

EXAMPLE 2

5 g. of N-methacryloyloxyethylmorpholine, 20 g. of methyl methacrylate and 75 g. of tetradecylmethacrylate were copolymerized according to the Example 1 to obtain the lubricating oil additive of the present invention, which had viscosity of 7,250 cst. at 37.8° C. (100° F.), and nitrogen content of the copolymer was 0.325%.

EXAMPLE 3

5 g. of N-(2-methacryloyloxypropyl)morpholine, 30 g. of ethylmethacrylate and 65 g. of hexadecyl methacrylate were copolymerized according to the Example 1 to obtain the lubricating oil additive of the present invention.

EXAMPLE 4

7.5 g. of N-(2-methacryloyloxybutyl)morpholine, 40 g. of butyl methacrylate and 52.5 g. of hexadecylmethacrylate were copolymerized according to the Example 1 to obtain the lubricating oil additive of the present invention.

EXAMPLE 5

10 g. of N-(2-methacryloyloxydodecyl)morpholine, 50 g. of butyl methacrylate and 40 g. of octadecyl methacrylate were copolymerized according to the Example 1 to obtain the lubricating oil additive of the present invention.

EXAMPLE 6

15 g. of N-(2-methacryloyloxyoctadecyl)morpholine, 40 g. of isobutyl methacrylate and 45 g. of octadecyl methacrylate were copolymerized according to the Example 1 to obtain the lubricating oil additive of the present invention.

EXAMPLE 7

5 g. of N-acryloyloxyethylmorpholine, 30 g. of butyl acrylate and 65 g. of decyl acrylate were copolymerized according to the Example 1 to obtain the lubricating oil additive of the present invention.

EXAMPLE 8

12.5 g. of methacryloylpentaoxyethylmorpholine (or methacrylate of tetraethyleneglycolmonomorpholinoethyl ether), 25 g. of butyl methacrylate and 62.5 g. of dodecyl methacrylate were copolymerized according to the Example 1 to obtain the lubricating oil additive of the present invention.

EXAMPLE 9

15 g. of methacryloyldecaoxyethylmorpholine, 25 g. of isobutyl methacrylate and 60 g. of hexadecyl methacrylate were copolymerized according to the Example 1 to obtain the lubricating oil additive of the present invention.

EXAMPLE 10

10 g. of methacryloyltrioxypropylmorpholine, 20 g. of ethyl methacrylate and 70 g. of octadecyl methacrylate were copolymerized according to the Example 1 to obtain the lubricating oil additive of the present invention.

EXAMPLE 11

Fifteen grams of methyl methacrylate, 2.14 g. of maleic anhydride and 80 g. of dodecyl methacrylate were copolymerized according to the Example 1.

The obtained intermediate copolymer in the solution was esterified wth 2.86 g. of N-oxyethylmorpholine at 170–200° C. to obtain the lubricating oil additive of the present invention.

EXAMPLE 12

5 g. of dimethyl maleate, 5 g. of butyl methacrylate and 85 g. of dodecyl methacrylate were copolymerized according to the Example 1.

The obtained intermediate copolymer was ester-interchanged with 4.6 g. of N-oxyethylmorpholine in the presence of 0.23 g. of sodium methylate at 150–160° C. for 5 hours.

The resulting mixture of the copolymer, mineral oil and sodium methylate was dissolved in benzene 10 times as much as the mixture and then the benzene solution was added dropwise to methanol 10 times as much as the benzene solution to precipitate the copolymer fractionally.

The precipitate was dried under vacuum, and dissolved in 233 g. of mineral oil to obtain the lubricating oil additive of the present invention, which had viscosity of 6,500 cst. at 37.8° C. (100° F.) and nitrogen content of the compolymer was 0.35%.

EXAMPLE 13

2.18 g. of maleic anhydride, 10 g. of methyl methacrylate and 80 g. of octadecyl methacrylate were copolymerized according to the Example 1.

The obtained intermediate copolymer was half esterified with 292 g. of N-oxyethylmorpholine at 170–200° C. and then reacted with 4.9 g. of ethylene oxide at 120–130° C. to obtain the lubricating oil additive of the present invention.

EXAMPLE 14

2.06 g. of maleic anhydride, 32.5 g. of butyl acrylate and 60 g. of dodecyl acrylate were copolymerized according to the Example 1.

The obtained intermediate copolymer was half esterified with 2.75 g. of N-oxyethylmorpholine at 170–200° C. and then reacted with 2.69 g. of octylene oxide at 120–120° C. to obtain the lubricating oil additive of the present invention.

EXAMPLE 15

0.86 g. of maleic anhydride, 16 g. of methyl methacrylate and 80 g. of octadecyl methacrylate were copolymerized according to the Example 1.

The obtained intermediate copolymer was half esterified with 2.68 g. of tetraethyleneglycolmonomorpholinoethyl ether at 170–200° C. and then amidified with 1.62 g. of dibutylaminopropylamine at 170–200° C. to obtain the lubricant additive of the present invention.

EXAMPLE 16

1.39 g. of maleic anhydride, 25 g. of butyl acrylate and 65 g. of octadecyl acrylate were copolymerized according to the Example 1.

The obtained intermediate copolymer was half esterified with 7.49 g. of nonaethyleneglycolmonomorpholinoethyl ether at 170–200° C. and then amidified with 1.39 g. of cyclohexyl amine at 170–200° C. to obtain the lubricant additive of the present invention.

EXAMPLE 17

1.76 g. of maleic anhydride, 10 g. of methyl methacrylate and 82.5 g. of dodecyl methacrylate were copolymerized according to the Example 1.

The obtained intermediate copolymer was half esterified with 2.61 g. of N-(2-oxypropyl)morpholine at 170–200° C. and then reacted with 3.13 g. of propylene oxide at 120–130° C. to obtain the lubricant additive of the present invention.

The following "references" illustrate the preparation of copolymers for conventional lubricating additives, that is, additives known to the prior art. They are added for comparison purposes.

Reference 1

5 g. of diacetone acrylamide, 20 g. of ethyl methacrylate and 75 g. of dodecyl methacrylate were copolymerized according to the Example 1 to obtain the lubricating oil additive of the Reference 1.

Reference 2

5 g. of hydroxyethyl methacrylate, 20 g. of methyl methacrylate and 75 g. of octadecyl methacrylate were copolymerized according to the Example 1 to obtain the lubricating oil additive of the Reference 2.

Reference 3

10 g. of vinyl pyrrolidone, 30 g. of butyl methacrylate and 70 g. of dodecyl methacrylate were copolymerized according to the Example 1 to obtain the lubricating oil additive of the Reference 3.

The following tests illustrate the outstanding effectiveness of the lubricant additives of the present invention. Lubricating oil additives obtained in Examples 1–17 and References 1–3 were respectively added to an SAE 10 mineral oil, and the sludge dispersibilities were tested.

The results are shown in Table I. The sludge dispersibility was determined by means of panel coking test Federal Test Method No. 791a, Method 3462 (1961). Outlines of the test procedure are as follows: Lubricating oils containing 5% by weight of additive of the present invention and 0.5% by weight of antioxidant (zinc dialkyldithiophosphate type) were heated to 120° C., and they were splashed against an aluminum panel (1.46 x 3.45 x 0.24 inches) heated at 300° C. by means of splasher rotating for 1 second at the interval of 9 seconds at 1,000 r.p.m. This procedure was continued for 5 hours. Then the aluminum panel was displaced, and by weighing coke deposited on the panel surfaces and by observing the panel surfaces with eyes, the sludge dispersibility of the lubricant additives of the present invention was evaluated. In observing the panels with eyes, we judged dispersibility in the grades of 0–10. Grade 10 means that the panel surface is almost unchanged compared with that before test, and grade 0 means that the panel surface is completely black because of deposit of coke.

TABLE I

| Number | Kind of additive | Amount of coke deposited (mg.) | Grade |
|---|---|---|---|
| 1 | Additive obtained in Example 1 | 37.2 | 6.5 |
| 2 | Additive obtained in Example 2 | 34.6 | 7.0 |
| 3 | Additive obtained in Example 3 | 35.0 | 7.0 |
| 4 | Additive obtained in Example 4 | 30.2 | 7.5 |
| 5 | Additive obtained in Example 5 | 32.3 | 7.0 |
| 6 | Additive obtained in Example 6 | 39.1 | 6.5 |
| 7 | Additive obrained in Example 7 | 31.3 | 7.0 |
| 8 | Additive obtained in Example 8 | 30.2 | 7.0 |
| 9 | Additive obtained in Example 9 | 39.8 | 6.5 |
| 10 | Additive obtained in Example 10 | 36.9 | 7.0 |
| 11 | Additive obtained in Example 11 | 38.7 | 6.0 |
| 12 | Additive obtained in Example 12 | 39.0 | 6.0 |
| 13 | Additive obtained in Example 13 | 38.6 | 6.5 |
| 14 | Additive obtained in Example 14 | 37.2 | 6.0 |
| 15 | Additive obtained in Example 15 | 25.5 | 7.5 |
| 16 | Additive obtzined in Example 16 | 33.8 | 7.0 |
| 17 | Additive obtained in Example 17 | 37.2 | 6.5 |
| 18 | Additive obtained in Reference 1 | 45.8 | 5.0 |
| 19 | Additive obtained in Reference 2 | 46.5 | 5.0 |
| 20 | Additive obtained in Reference 3 | 43.8 | 5.0 |
| 21 | Control | 60.4 | 0 |

What is claimed is:

1. A lubricating oil composition comprising a major portion of a lubricating oil and a minor portion of an oil-soluble copolymer having at least one unit (A) selected from the class consisting of the following Formulas I and II:

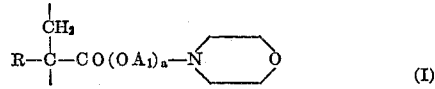

(I)

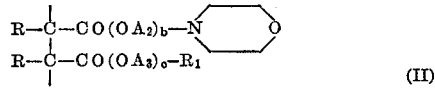

(II)

wherein each of $a$ and $b$ is an integer of 1 or higher, $c$ is an integer of 0, 1 or higher, $A_1$, $A_2$ and $A_3$ are the same or different alkylene groups having 2 to 18 carbon atoms, R's are independently hydrogen atoms or methyl groups, and $R_1$ is a hydroxyl group, a residue obtained by eliminating an active hydrogen from a hydroxy compound selected from the group consisting of alkanols having up to 18 carbon atoms, cyclohexyl alcohol, benzyl alcohol, phenol, hydroxystearic acid, and hydroxystearyl methyl ester, or a residue obtained by eliminating an active hydrogen atom from an amino compound having up to 18 carbon atoms and having at least one active hydrogen atom, when $c$ is 0 and when $c$ is 1 or higher $R_1$ is a hydroxyl group or residue obtained by eliminating an active hydrogen atom from an organic compound having at least one active hydrogen atom and selected from the group consisting of amino compounds as defined above, hydroxy compounds as defined above and alkyl carboxylic acids having up to 18 carbon atoms, at least one unit (B)

selected from the class consisting of the following Formula III:

 (III)

wherein R is a hydrogen atom or a methyl group and $R_2$ is an alkyl group having 1–4 carbon atoms, and at least one unit (C) selected from the class consisting of (IV):

 (IV)

wherein R is a hydrogen atom or a methyl group and $R_3$ is an alkyl group having at least 10 carbon atoms, the ratio of the units (A), (B) and (C) in the said copolymer being 0.05–30 (A): 1–60 (B): at least 10 (C) by weight.

2. A lubricating oil composition according to claim 1, wherein each of $a$ and $b$ is an integer of 1–10, and $c$ is an integer of 0–10 in the above Formulas I and II.

3. A lubricating oil composition according to claim 1, wherein the unit (A) has the following formula:

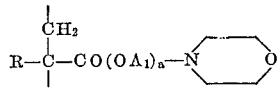

wherein R is a hydrogen atom or a methyl group, $A_1$ is an alkylene group having 2–18 carbons and $a$ is 1–10.

4. A lubricating oil composition according to claim 3, wherein the unit (A) has the following formula:

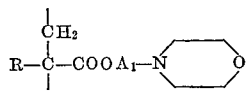

wherein R and A are as defined in claim 3.

5. A lubricating oil composition according to claim 1, wherein the unit (A) has the following formula:

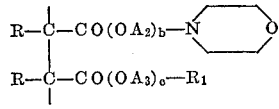

wherein R's, $A_2$, $A_3$, $b$ and $c$ are as defined in claim 1 and $R_1$ is a hydroxyl group or a residue obtained by eliminating an active hydrogen atom from the amino group of an amino compound as defined above.

6. A lubricating oil composition according to claim 5, wherein the unit (A) has the following formula:

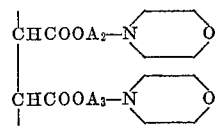

wherein $A_2$ and $A_3$ are as defined in claim 5.

7. A lubricating oil composition according to claim 1, wherein the oil-soluble copolymer is used in an amount of 0.01–30% by weight based on the weight of the lubricating oil.

8. A lubricating composition according to claim 1, wherein $R_1$ is the residue of an amino compound selected from the group consisting of ethylamine, diethylamine, propylamine, dipropylamine, isopropylamine, diisopropylamine, butylamine, dibutylamine, diisobutylamine, sec.-butylamine, tert.-butylamine, hexylamine, octylamine, 2-ethylhexylamine, decylamine, dodecylamine, tetradecylamine, hexadecylamine, octadecylamine, cyclohexylamine, benzylamine, monoacetylethylenediamine, monobutyroylethylenediamine, monocaployloylethylenediamine, monolauroylethylenediamine, monostearoylethylenediamine, monobenzoylethylenediamine, dimethylaminoethylamine, diethylaminoethylamine, dimethylaminopropylamine, diethylaminopropylamine, dipropylaminopropylamine, dibutylaminopropylamine, aniline, morpholine, pyrrolidine, piperidine, imidazole, imidazoline, γ-butyrolactam, ε-caprolactam, isobutylamine, and mixtures thereof.

9. A lubricating composition according to claim 1, wherein the unit (A) in the oil soluble copolymer has the following formula:

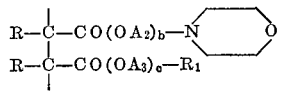

wherein the R's, $A_2$, $A_3$, $b$ and $c$ are as defined in claim 8 and $R_1$ is a hydroxyl group or a residue obtained by eliminating an active hydrogen atom from an alkanol having up to 18 carbon atoms when $c$ is 0 and a hydroxyl group or morpholino group when $c$ is 1 or higher.

References Cited
UNITED STATES PATENTS

| | | | |
|---|---|---|---|
| 3,311,558 | 3/1967 | Prizer et al. | 252—51.5 A |
| 3,371,040 | 2/1968 | Emmons | 252—51.5 A |
| 3,413,226 | 11/1968 | Coleman | 252—51.5 A |
| 3,418,298 | 12/1968 | Bearden | 252—51.5 A |

WERTEN F. W. BELLAMY, Primary Examiner